United States Patent
Kizumi

(10) Patent No.: US 10,147,003 B2
(45) Date of Patent: Dec. 4, 2018

(54) LANE DETECTION DEVICE AND METHOD THEREOF, CURVE STARTING POINT DETECTION DEVICE AND METHOD THEREOF, AND STEERING ASSISTANCE DEVICE AND METHOD THEREOF

(71) Applicant: HONDA MOTOR CO., LTD., Tokyo (JP)

(72) Inventor: Yuki Kizumi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 165 days.

(21) Appl. No.: 15/136,364

(22) Filed: Apr. 22, 2016

(65) Prior Publication Data

US 2016/0314360 A1    Oct. 27, 2016

(30) Foreign Application Priority Data

Apr. 23, 2015 (JP) .................. 2015-088419

(51) Int. Cl.
*G06K 9/00* (2006.01)
*B62D 15/02* (2006.01)
*H04N 5/232* (2006.01)

(52) U.S. Cl.
CPC ....... *G06K 9/00798* (2013.01); *B62D 15/025* (2013.01); *H04N 5/23229* (2013.01)

(58) Field of Classification Search
CPC ........... G06K 9/00798; H04N 5/23229; B62D 15/025
See application file for complete search history.

(56) References Cited

U.S. PATENT DOCUMENTS

| 2012/0062747 A1* | 3/2012 | Zeng | B60W 40/06 348/149 |
| 2012/0101701 A1* | 4/2012 | Moshchuk | B60W 10/184 701/70 |

FOREIGN PATENT DOCUMENTS

| JP | 2007-264714 A | 10/2007 |
| JP | 2007-316767 A | 12/2007 |
| JP | 2009-9331 A | 1/2009 |
| JP | 2011-215769 A | 10/2011 |
| JP | 2013-126854 A | 6/2013 |

OTHER PUBLICATIONS

Office Action dated Aug. 14, 2018, issued in counterpart Japanese Application No. 2015-088419, with English machine translation. (7 pages).

* cited by examiner

*Primary Examiner* — Christopher S Kelley
*Assistant Examiner* — Nasim N Nirjhar
(74) *Attorney, Agent, or Firm* — Westerman, Hattori, Daniels & Adrian, LLP

(57) ABSTRACT

A more accurate lane is estimated by using a lane at a previous time point after coordinate conversion that is coordinate-converted based on traveling information (a vehicle speed and a yaw rate) at a current time point, as well as a lane at the current time point.

4 Claims, 12 Drawing Sheets

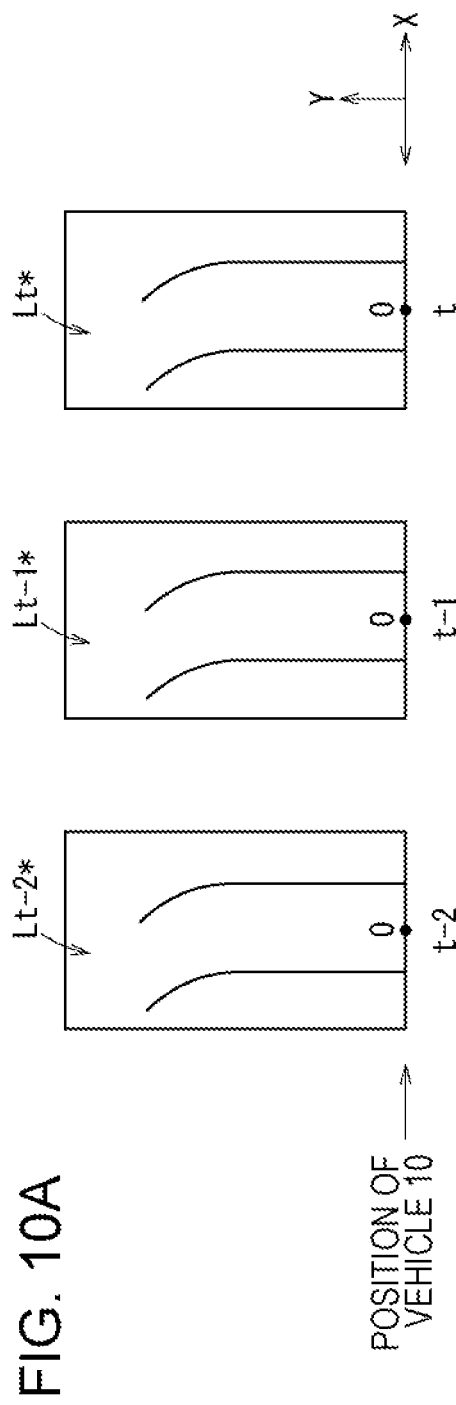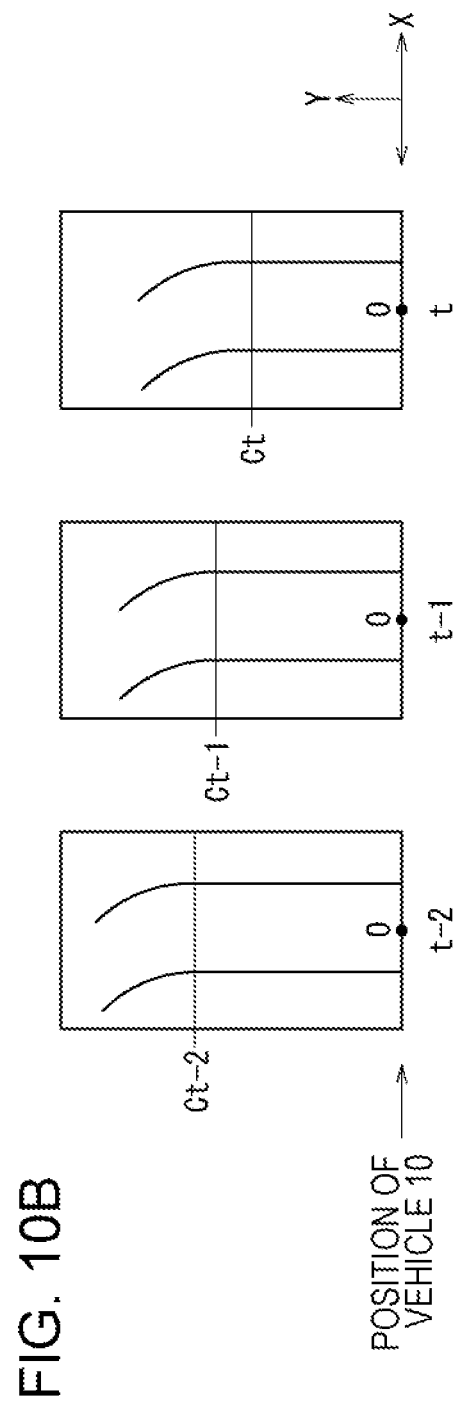

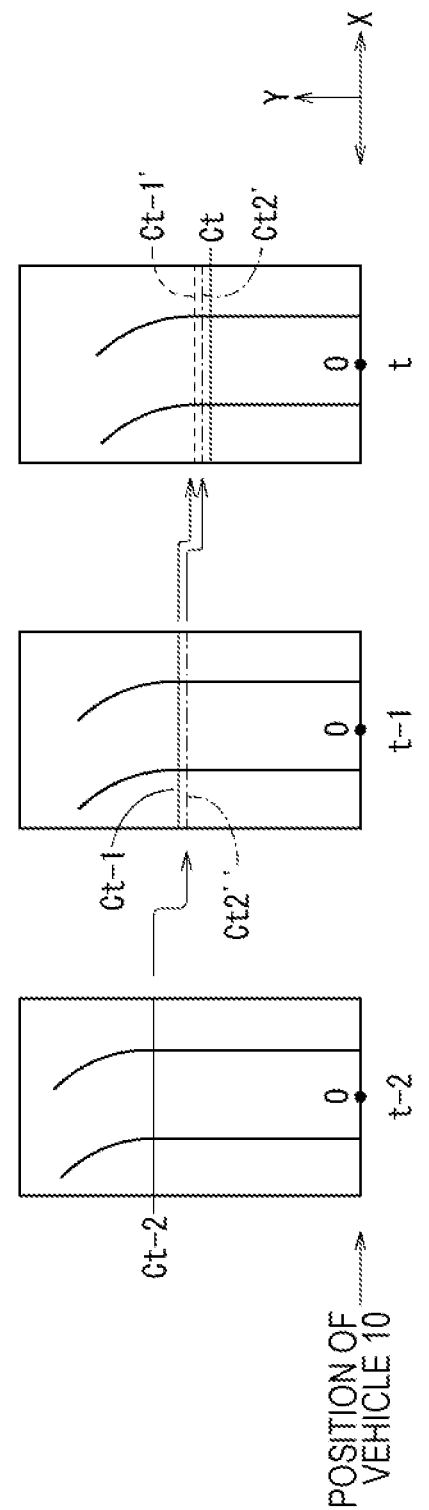

LANE DETECTION DEVICE AND METHOD THEREOF, CURVE STARTING POINT DETECTION DEVICE AND METHOD THEREOF, AND STEERING ASSISTANCE DEVICE AND METHOD THEREOF

CROSS REFERENCES TO RELATED APPLICATIONS

The present application claims priority under 35 U.S.C. § 119 to Japanese Patent Application No. 2015-088419, filed Apr. 23, 2015, entitled "Lane Detection Device and Method thereof, Curve Starting Point Detection Device and Method thereof, and Steering Assistance Device and Method thereof." The contents of this application are incorporated herein by reference in their entirety.

BACKGROUND

1. Field

The present disclosure relates to a lane detection device that detects a lane mark (mark representing a lane border) formed on a surface of a road on which a vehicle is running from a forward image captured by an onboard imaging device and detects a lane (traffic lane) from the detected lane mark, and a method thereof; a curve starting point detection device and a method thereof; and a steering assistance device and a method thereof.

2. Description of the Related Art

For example, Japanese Unexamined Patent Application Publication No. 2009-009331 discloses converting a captured image of a road surface into a bird's-eye image of the road surface viewed from directly above, searching the bird's-eye image for a white-line candidate pixel representing a white line drawn on the road surface, and determining the white line based on an approximate straight line determined from the found white-line candidate pixel by the least-square method.

Japanese Unexamined Patent Application Publication No. 2009-009331 discloses adjusting a weight of the white-line candidate pixel and detecting a white line based on an approximate straight line determined from the white-line candidate pixel after adjustment of the weight in order to eliminate any influence of an error that may occur when converting a captured image into a bird's-eye image to determine the approximate straight line.

Japanese Unexamined Patent Application Publication No. 2013-126854 discloses determining a curve entry position from a traveling trace and a steering angle of a preceding vehicle that are acquired through vehicle-to-vehicle communications, starting cornering control along the traveling trace of the preceding vehicle when an own (subject) vehicle reaches the curve entry position, and terminating the cornering control at a curve exit position.

SUMMARY

Incidentally, when a lane of a straight path extends in front of a vehicle and automatic lane keeping driving is performed on a vehicle attempting to drive on a course in which a curved lane extends in the front of the straight path, based on an image from an imaging device, or when the lane keeping driving is assisted based on the image from the imaging device, the straight path should be accurately estimated from the image. In addition, when the lane keeping driving is performed or assisted at the curve, a starting point of the curve and a curvature radius of the curve should be accurately estimated.

However, when a part of a lane mark such as a white line is faded or is hidden by presence of a preceding vehicle, or when a lane mark cannot be temporarily detected due to backlight or headlights of an oncoming car during the night, the technology disclosed in Japanese Unexamined Patent Application Publication No. 2009-009331 has a problem that the white-line candidate pixel based on an image of the imaging device is missing and precision of an approximate straight line to be determined by the least-square method degrades.

The technology disclosed in Japanese Unexamined Patent Application Publication No. 2013-126854 cannot perform steering assistance control or the like when a traveling trace or a steering angle of a preceding vehicle cannot be acquired, because it does not detect the straight path or the curve in the first place.

The disclosure has been made in light of such problems described above, and it is desirable to provide a lane detection device capable of accurately estimating a lane even when a lane mark cannot be temporarily detected, such as when a part of the lane mark is faded or missing and a method thereof, a curve starting point detection device and a method thereof, and a steering assistance device and a method thereof.

A lane detection device according to the disclosure includes: an imaging device for capturing an image of a forward view of a vehicle including a road surface; a lane detection unit that detects a lane mark formed on the road surface from the image captured by the imaging device and detects a "lane" from the detected lane mark (which provides "lane information" formed of one or more, typically a pair of imaginary lines defined along the lane mark detected on a road, typically by straight line approximation, curved line approximation and combination thereof based on a series of lane mark points detected in the road surface image, and the "lane information" can simply be referred to as the "lane," in this application); a lane storage unit that stores a current-time lane detected by the lane detection unit and a previous-time lane detected by the lane detection unit a predetermined time before the current time point; a traveling information detection unit that detects traveling information of the vehicle when the lane is detected; and a lane estimation unit that estimates a reliable current-time lane through curve approximation (which is more reliable than when the present invention is not applied to) on the basis of a previous-time lane after coordinate conversion, into which the previous-time lane is coordinate-converted based on the traveling information at the current time point, and of the current-time lane.

According to the disclosure, since the more reliable current-time lane is estimated by using the previous-time lane after the coordinate conversion that is coordinate-converted based on the traveling information at the current time point, in addition to the current-time lane, the more reliable current-time lane can be accurately estimated from a lane composed of a time series of the current time point and the previous time point even when a lane mark cannot be temporarily detected such as when a part of the lane mark is faded or missing.

In this case, the traveling information at the current time point may be a vehicle speed and a yaw rate at the current time point or a vehicle speed and a steering angle at the current time point. In addition, the lane estimation unit may estimate the more reliable current-time lane by superimposing the current-time lane and the previous-time lane after coordinate conversion.

According to the disclosure, since a lane is estimated through curve approximation made by superimposing a current-time lane and a previous-time lane after coordinate conversion with a vehicle speed and a yaw rate at a current time point or a vehicle speed and a steering angle at a current time point, a more reliable current-time lane can be estimated even in the case of a lane including a curve.

In this case, when estimating the more reliable current-time lane by superimposing the current-time lane and the previous-time lane after coordinate conversion, the lane estimation unit can estimate an accurate lane in a stable manner by performing robust estimation such as superimposition by making a weighting factor of the previous-time lane after coordinate conversion smaller than a weighting factor of the current-time lane.

In addition, if the current-time lane has a missing part when the lane estimation unit estimates the more reliable current-time lane by superimposing the current-time lane and the previous-time lane after coordinate conversion, the lane estimation unit can more reliably perform robust estimation of a part in the current-time lane having the missing part through superimposition, if the weighting factor of the current-time lane is used for a lane of the previous-time lane after coordinate conversion which is located at a position corresponding to the current-time lane having the missing part, instead of making the weighting factor small, when performing superimposition.

A curve starting point detection device according to the disclosure includes the lane detection device, wherein the more reliable current-time lane estimated by the lane estimation unit is an approximate curve lane extending forward from an own vehicle position. The curve starting point detection device, further includes: a straight-lane-behind-own-vehicle estimation unit that estimates a more reliable current-time lane extending backward from the own vehicle position on the basis of a previous-time lane extending backward from the own vehicle position after coordinate conversion, into which a previous-time lane extending backward from the own vehicle position is coordinate-converted based on the traveling information at the current time point, and of a current-time lane extending backward from the own vehicle position; and a curve starting point estimation unit that superimposes a more reliable approximate straight lane at a current time point extending backward from the own vehicle position on the approximate curve lane extending forward from the own vehicle position; detects as a current-time curve starting point candidate point, a point at which a distance in a vehicle width direction between a straight line extended forward from the own vehicle position along the approximate straight lane and the approximate curve lane reaches or exceeds a threshold distance and detects a curve starting point candidate point in the previous-time lane after the coordinate conversion; matches a maximum value of a Gaussian distribution function that is defined along a direction of the straight line extended forward from the own vehicle position to the curve starting point candidate point detected at the current time point, and matches a maximum value of the Gaussian distribution function that is defined along the direction of the straight line to the curve starting point candidate point in the previous-time lane after the coordinate conversion; and estimates, as a more reliable curve starting point, a position of a maximum value of a composite distribution function obtained by adding the Gaussian distribution functions.

According to the disclosure, a more reliable curve starting point can be estimated in a stable manner, because the more reliable current-time curve starting point is estimated using a curve starting point in a lane at a previous time point after coordinate conversion, in addition to a curve starting point in a lane at a current time point.

Now, the curve starting point estimation unit may superimpose a more reliable current-time approximate straight lane extending backward from the own vehicle position on the approximate curve lane extending forward from the own vehicle position. The curve starting point-estimation unit may detect, as a current-time curve starting point candidate point, a point at which a distance in the vehicle width direction between a straight line which is the approximate straight lane extended forward from the own vehicle position and the approximate curve lane reaches or exceeds a threshold distance, and detect a curve starting point candidate point in the previous-time lane after the coordinate conversion. The curve starting point estimation unit may match a maximum value of a Gaussian distribution function that is defined along the direction of the straight line extended forward from the own vehicle position to the curve starting point candidate point detected at the current-time point, match a maximum value of another Gaussian distribution function that is defined along the straight line direction to a curve starting point candidate point in the previous-time lane after the coordinate conversion, and the maximum value of the other Gaussian distribution function is made smaller than the maximum value of the Gaussian distribution function. The curve starting point estimation unit may also estimate, as a more reliable curve starting point, a position of a maximum value of a composite distribution function obtained by adding the Gaussian distribution function having the maximum value and the other Gaussian distribution function having the smaller maximum value.

In this manner, a more reliable curve starting point can be estimated in a more stable manner by making weight of a curve starting point detected at a current time point, which is located closer to the own vehicle, larger than weight of a curve starting point detected at a previous time point, which is located farther from the curve starting point detected at the current time point, and thereby estimating a curve starting point.

A steering assistance device according to the disclosure is a steering assistance device having the curve starting point detection device. It further has an actuator that generates steering assistance force of the vehicle. Since the steering assistance device is configured to determine timing at which the actuator starts to apply the vehicle steering assistance force, by using the more reliable curve starting point estimated by the curve starting point estimation unit, steering assistance can be provided at a position of a more reliable curve starting position and at more accurate timing.

A lane detection method according to the disclosure includes a lane detection step of detecting a lane mark formed on a road surface from an image captured by an imaging device that captures the image of a forward view of a vehicle including the road surface and detecting from the detected lane mark a lane on which the vehicle is traveling; a lane storage step of storing a current-time lane detected in the lane detection step and a previous-time lane detected in the lane detection step a predetermined time before the current time point; a traveling information detection step of detecting traveling information of the vehicle when the lane is detected; and a lane estimation step of estimating a more reliable current-time lane through curve approximation on the basis of a previous-time lane after coordinate conversion, into which the previous-time lane is coordinate-converted based on the traveling information at the current time point, and of the current-time lane.

According to the disclosure, since the more reliable current-time lane is estimated by using the previous-time lane after the coordinate conversion that is coordinate-converted based on the traveling information at the current time point, in addition to the current-time lane, a more reliable current-time lane can be accurately estimated from a lane composed of a time series of the current time point and the previous time point even when a lane mark cannot be temporarily detected such as when a part of the lane mark (lane) is faded or when a part of the lane mark (lane) is missing.

In this case, the traveling information at the current time point may include a vehicle speed and a yaw rate at the current time point or a vehicle speed and a steering angle at a current time point. In addition, the lane estimation step may estimate the more reliable current-time lane by superimposing the current-time lane and the previous-time lane after coordinate conversion.

In this case, in the lane estimation step, an accurate lane can be estimated in a stable manner by performing robust estimation such as superimposition by making a weighting factor of the previous-time lane after coordinate conversion smaller than a weighting factor of the current-time lane, when the more reliable current-time lane is estimated by superimposing the current-time lane and the previous-time lane after coordinate conversion.

In addition, in the lane estimation step, if the current-time lane has a missing part when the more reliable current-time lane is estimated by superimposing the current-time lane and the previous-time lane after coordinate conversion, robust estimation of a part in the current-time lane having the missing part can be performed more reliably through superimposition, if the weighting factor of the current-time lane is used to perform superimposition, rather than making small the weighting factor of a lane of the previous-time lane after coordinate conversion which is located at a position corresponding to the current-time lane having the missing part.

A curve starting point detection method (to which the lane detection method is applied) according to the disclosure is a method in which the more reliable current-time lane estimated by the lane estimation step is an approximate curve lane extending forward from an own vehicle position, the method further including: a straight-lane-behind-own-vehicle estimation step of estimating a more reliable current-time lane extending backward from the own vehicle position through linear approximation on the basis of a previous-time lane extending backward from the own vehicle position after coordinate conversion, into which a previous-time lane extending backward from the own vehicle position is coordinate-converted based on the traveling information at a current time point, and of a current-time lane extending backward from the own vehicle position; and a curve starting point estimation step of superimposing a more reliable current-time approximate straight lane extending backward from the own vehicle position on the approximate curve lane extending forward from the own vehicle position; detecting, as a current-time curve starting point candidate point, a point at which a distance in a vehicle width direction between a straight line extended forward from the own vehicle position along the approximate straight lane and the approximate curve lane reaches or exceeds a threshold distance and detecting a curve starting point candidate point in the previous-time lane after the coordinate conversion; matching a maximum value of a Gaussian distribution function that is defined along a direction of the straight line extended forward from the own vehicle position to the curve starting point candidate point detected at the current time point and matching a maximum value of the Gaussian distribution function that is defined along the direction of the straight line extended forward from the own vehicle position to a curve starting point candidate point in the previous-time lane after the coordinate conversion; and estimating, as a more reliable curve starting point, a position of a maximum value of a composite distribution function obtained by adding the Gaussian distribution functions.

According to the disclosure, a more reliable curve starting point can be estimated in a stable manner, because the more reliable curve starting point is estimated using a curve starting point at a previous time point after coordinate conversion, in addition to a curve starting point at a current time point.

Now, in the curve starting point estimation step, a more reliable current-time approximate straight lane extending backward from the own vehicle position may be superimposed on the approximate curve lane extending forward from the own vehicle position, a point at which a distance in the vehicle width direction between a straight line extended forward from the own vehicle position along the approximate straight lane and the approximate curve lane reaches or exceeds a threshold distance may be detected as a current-time curve starting point candidate point, and a curve starting point candidate point in the previous-time lane after the coordinate conversion may be detected. A maximum value of a Gaussian distribution function that is defined along the direction of the straight line extended forward from the own vehicle position may be matched to the curve starting point candidate point detected at the current time point, a maximum value of another Gaussian distribution function that is defined along the direction of the straight line extended forward from the own vehicle position may be matched to a curve starting point candidate point in the previous-time lane after the coordinate conversion, and the maximum value of the other Gaussian distribution function is made smaller than the maximum value of the Gaussian distribution function. Then, a position of a maximum value of a composite distribution function obtained by adding the Gaussian distribution function having the maximum value and the other Gaussian distribution function having the smaller maximum value may also be estimated as a more reliable curve starting point.

In this manner, a more reliable curve starting point can be estimated in a more stable manner by making weight of a curve starting point detected at a current time point, which is located closer to the own vehicle, larger than weight of a curve starting point detected at a previous time point, which is located farther from the curve starting point detected at the current time point, and thereby estimating a curve starting point.

A steering assistance method according to the disclosure is a steering assistance method to which the curve starting point detection method described above is applied. Furthermore, since in a steering assistance starting timing determination step, the more reliable curve starting point is used to determine timing at which an actuator that generates steering assistance force of the vehicle starts to apply the vehicle steering assistance force, steering assistance can be provided at a position of a more reliable curve starting position and at accurate timing.

According to the disclosure, since the more reliable current-time lane is estimated by using the previous-time lane after coordinate conversion that is coordinate-converted based on traveling information at a current time point, in addition to a current-time lane, a lane can be accurately estimated even when a lane mark cannot be temporarily detected, such as when a part of the lane mark is faded or missing. The word "unit" used in this application may mean a physical part or component of computer hardware including a controller, a processor, a memory, etc., which is configured to perform intended functions.

BRIEF DESCRIPTION OF THE DRAWINGS

FIG. 10A is an illustration of current-time and previous-time lanes estimated through the superimposition robust estimation process.

FIG. 10B is an illustration of curve starting point candidate points detected in respective lanes at the current time point and the previous time point that are estimated through the superimposition robust estimation process.

FIG. 11 is an illustration of a process to convert coordinates of a previous-time curve starting point candidate onto a current-time curve starting point candidate based on traveling information at a current time point.

DESCRIPTION OF THE PREFERRED EMBODIMENTS

Preferred embodiments of the present disclosure are described in detail hereinafter with reference to the attached drawings.

Figure 1:
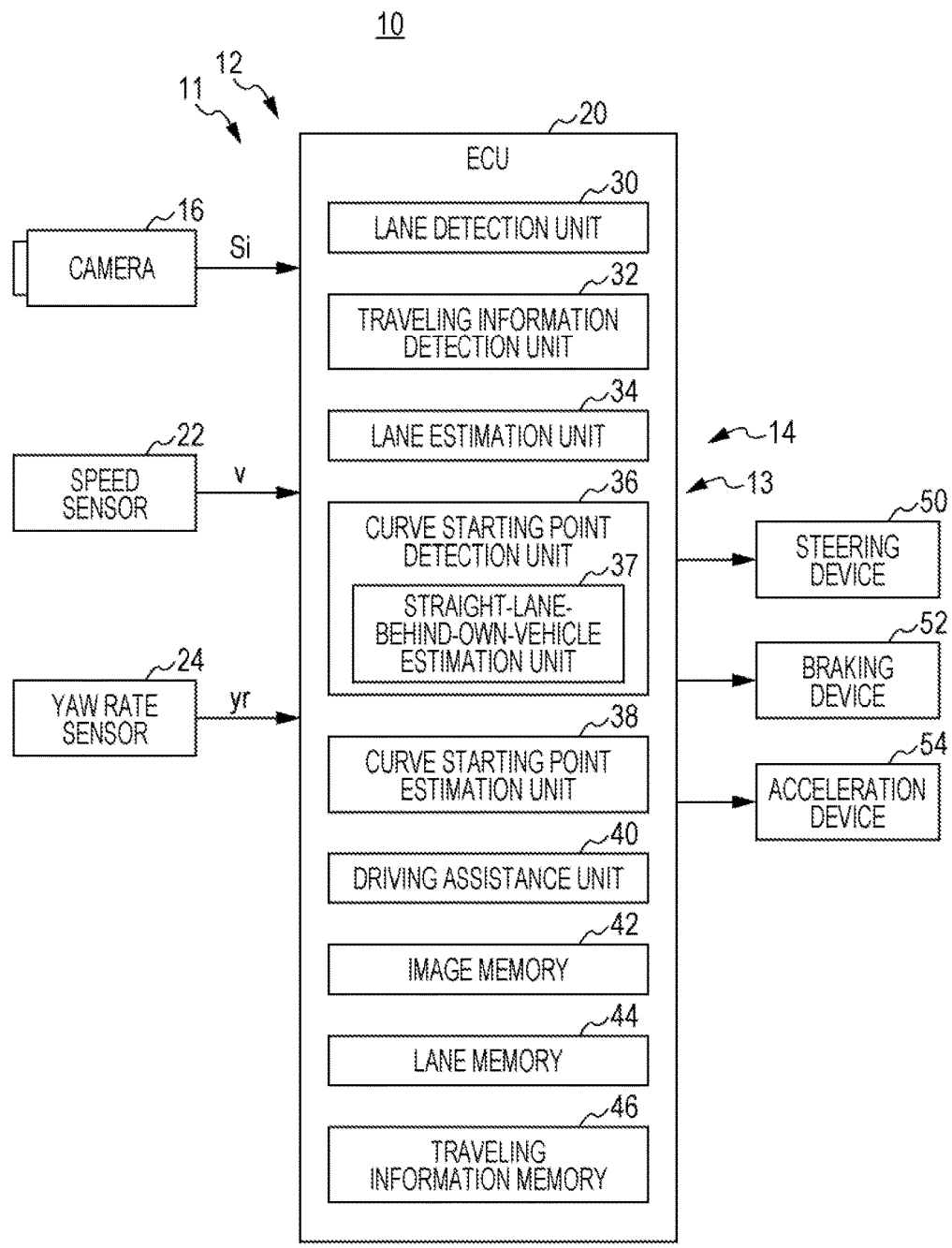
FIG. 1 is a block diagram illustrating a schematic configuration of a vehicle on which a lane detection device including a curve detection device according to one embodiment of a device and a method according to the disclosure is mounted.

FIG. 1 is a block diagram illustrating a schematic configuration of a vehicle (own vehicle) 10 that implements a lane detection device and a method thereof, a curve starting point detection device and a method thereof, and a steering assistance device and a method thereof according to the embodiment.

The vehicle 10 includes a lane detection device 11, a curve starting point detection device 12, and a steering assistance device 13.

The lane detection device 11, the curve starting point detection device 12, and the steering assistance device 13 are configured as parts of a capability of a driving assistance device 14. The driving assistance device 14 is mounted on the vehicle 10 to assist a driver of the vehicle 10 in a steering operation of a steering wheel or a braking operation with a brake pedal, or the like when the vehicle 10 travels along a lane border line (hereinafter referred to as a lane mark) formed on the road.

Note that while in the embodiment is illustrated an example in which the lane detection device 11 and the curve starting point detection device 12 are applied to the steering assistance device 13 in the driving assistance device 14, they can also be applied to any automatic driving device (including an automatic steering device, an automatic braking device, and an automatic acceleration device) other than the driving assistance device 14.

A lane mark is a mark representing a lane border (lane section). The lane mark also includes a continuous mark (which may also be considered a deemed continuous line) consisting of Botts' dots or cat's eyes or the like, in addition to a continuous line (also referred to as a deemed continuous line) consisting of spacedly provided white dashed lines, and a continuous line of solid white line.

Basically, the vehicle 10 includes a camera 16 (imaging device) that captures an image of the forward view of the vehicle 10 including a road surface (course), an electronic control unit 20 (hereinafter referred to as an ECU 20) that detects a lane mark from an image captured by the camera 16 and detects a lane from the detected lane mark, and a driving assistance device 14.

The camera 16 is mounted in an upper part of a front windshield in the vehicle 10, captures an image of the forward view of the vehicle 10 through the front windshield, which includes a course ahead of the vehicle. The camera 16 may be a digital video camera, for example, and captures multiple images (of multiple frames) in a second, and outputs an image signal (video signal) Si. In this case, in the camera 16, with a mounting part thereof as an origin (origin position), is defined a real space coordinate system having the vehicle width direction (horizontal direction) of the vehicle 10 as the X axis, the vehicle length direction (traveling direction, forward direction, running direction) as the Y axis, and the vehicle height direction (vertical direction, perpendicular direction) as the Z axis.

The lane detection device 11, the curve starting point detection device 12, and the steering assistance device 13 include a speed sensor 22 that detects a vehicle speed v [m/s] of the vehicle 10 and a yaw rate sensor 24 that detects a yaw rate yr [deg/s] of the vehicle 10, in addition to the camera 16 and the ECO 20 described above.

The ECU 20 is a computing machine including a microcomputer, and has a CPU (central processing unit), a ROM (also including an EEPROM) which is a memory, a RAM (random access memory), as well as an input/output device such as an A/D converter, a D/A converter, a timer as a clocking unit, or the like. The ECU 20 functions as various types of function implementation units (function implementation elements) by the CPU reading and executing a program recorded in the ROM.

In the embodiment, the ECU 20 functions as a lane detection unit 30, a traveling information detection unit 32, a lane estimation unit 34, a curve starting point detection unit 36 including a straight-lane-behind-own-vehicle estimation unit 37, a curve starting point estimation unit 38, and a driving assistance unit 40, or the like.

The ECU 20 also includes an image memory 42, a lane memory 44, and a traveling information memory 46 as a storage device.

The ECU 20 calculates a traveling direction {inclination to the X axis direction on an XY plane with the width direction of the vehicle 10 as the X axis and the Y axis direction ahead of the vehicle 10 as 0 [deg](reference), more specifically, a steering angle} of the vehicle 10 from a yaw rate yr [deg/s] which is an output signal of the yaw rate sensor 24. The yaw rate sensor 24 can be replaced by a steering angle sensor (not illustrated).

By controlling a steering device 50, a braking device 52, and an acceleration device 54 under predetermined conditions such as that a driver grasps a steering wheel (not illustrated), based on a lane estimated by the lane estimation unit 34 and a curve (including a curve starting point and a curvature radius) detected by the curve starting point estimation unit 38, the driving assistance device 14 provides the driver with driving assistance such as activation of the braking device 52 or an accelerator pedal reaction force application mechanism, not illustrated, before a curve (curve starting point) so that the vehicle 10 does not deviate from a course lying between lane marks on both sides in the width direction of the vehicle 10, more specifically, a lane (lane lines on both sides of the vehicle 10), in other words, so that the vehicle 10 can travel at almost the center of the lane.

Figure 2:
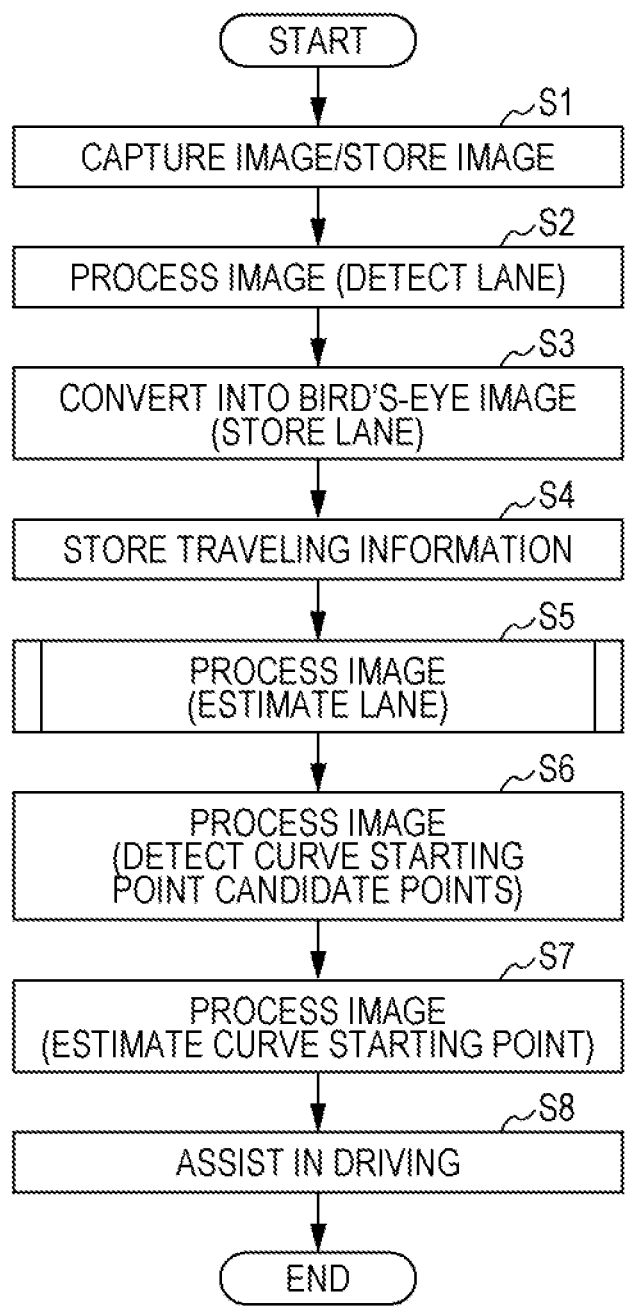
FIG. 2 is a flow chart provided to illustrate operation of the lane detection device and the curve detection device.

Then, operation of the vehicle 10 which is basically configured as described above is described in the order of each process of [lane estimation], [curve starting point estimation], and [driving assistance] with reference to the flow chart of FIG. 2. An execution entity of a program according to the flow chart is the (CPU of the) ECU 20.

[Lane Estimation]

In step S1, the ECU 20 loads (stores) in the image memory 42 images (gray scale images being multivalued images) captured by the camera 16, for every reference frame time (also referred to as specified time) ΔT [s], which is predetermined time, more specifically, for every capturing (frame) of images ahead of the vehicle.

Then, in step S2, image processing that performs a lane mark detection process by the lane detection unit 30 and a lane detection process based on the detected lane mark are performed.

In this case, the lane detection unit 30 loads an image exceeding predetermined intensity (brightness on a road surface is above predetermined brightness) from images captured by the camera 16, and performs differential processing while scanning an entire image (virtually, an image part in which lane marks exist) in the horizontal direction for every sensing line which are at fixed distance intervals in the Y axis direction (forward direction), thereby extracting edges (edge image) of the entire image from the vehicle 10 side (reference coordinate side).

Furthermore, in this step S2, the lane detection unit 30 extracts an image having a characteristic as a lane mark from the edges of the extracted entire image in a publicly known manner. Thus, the lane detection unit 30 detects a lane which consists of an image having the lane mark characteristic, in other words, point-series (intervals of the point-series in the forward direction of the vehicle 10 correspond to the fixed distance intervals mentioned above, in the case of a straight path) of feature points having the lane mark characteristic (lane detection step).

In step S3, the lane detection unit 30 coordinate-converts (projection-converts) the detected (extracted) lane [image (point-series of feature points) having a characteristic as a lane mark] into a bird's-eye image (image in planar view) viewed from perpendicularly above and loads (stores) it in the lane memory 44 (lane storage step).

Figure 3:
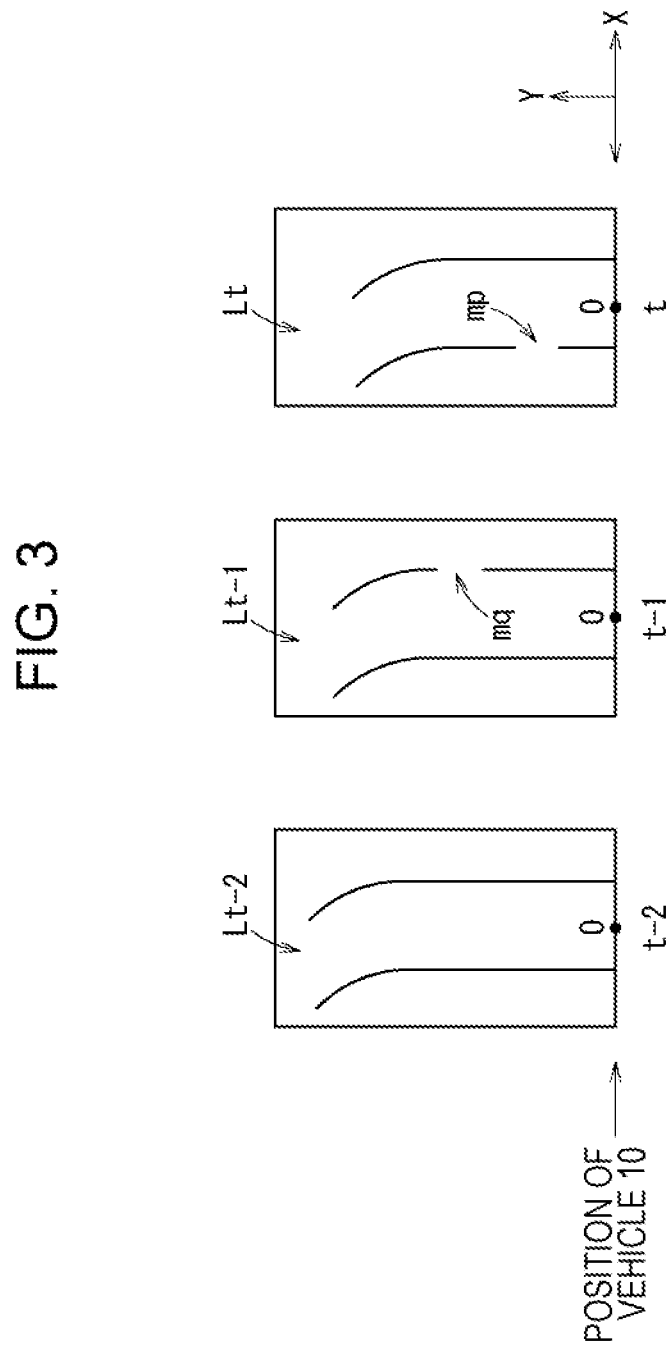
FIG. 3 is an illustration illustrating lanes in bird's-eye images at a current time point and previous time points.

In this case, as schematically illustrated in FIG. 3, in the lane memory 44 are stored as point-series of feature points having a position of the camera 16 of the vehicle 10 as an origin position (also referred to as an origin position of vehicle coordinates) O, lanes extracted in a predetermined number of previous frames [here, by way of example, in consideration of convenience of understanding, a lane Lt−1 at time t−1 (previous time point) which is earlier than time t by predetermined time ΔT and a lane Lt−2 at time t−2 (previous time point) which is earlier than the time t−1 by the predetermined time ΔT] as well as a lane (also referred to as a current-time lane at the time t) Lt extracted in a current frame.

It is seen from FIG. 3 that each image of the left line of the lane Lt at the time (current time point) t and the right line of the lane Lt−1 at the previous time point t−1 has a missing part mp or mq. It is also seen that a curve starting point comes closer to the vehicle 10 traveling forward (Y axis direction) as the time approaches to the current time point t from the previous time points t−2, t−1. Note that the missing parts mp, mq are generated when the lane marks are hidden by a vehicle ahead or due to the lane marks being faded or the like.

Then, in step S4, the ECU 20 loads (stores) into the traveling information memory 46 traveling information (traveling status) Rc of the vehicle 10 at the current time point t when a forward image of the vehicle is loaded into the image memory 42 by the camera 16 in step S1, here, the vehicle speed v by the speed sensor 22 and the yaw rate yr by the yaw rate sensor 24 or the like.

Then, as described in the following, in step S5, the lane estimation unit 34 coordinate-converts the lanes Lt−1, Lt−2 at the previous time points t−1, t−2 based on the traveling information Rc(v,yr) (v=vehicle speed, yr=yaw rate) at the current time point t, and estimates a more reliable lane Lt' at the current time point t based on the lanes Lt−1', Lt−2' at the previous time points t−1, t−2 after coordinate conversion and the lane Lt at the current time point t (lane estimation step).

Figure 4:
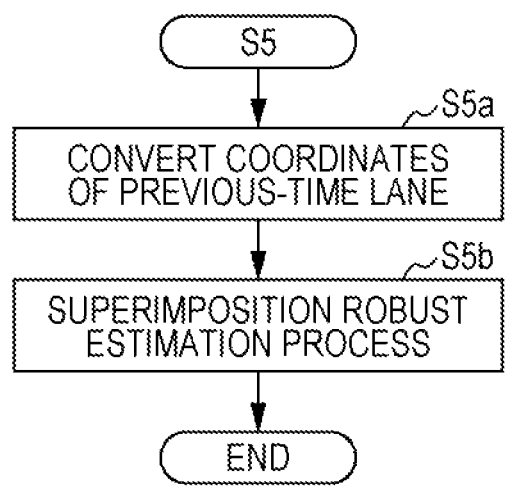
FIG. 4 is a detailed flow chart of a lane estimation process.

FIG. 4 is a detailed flow chart of the lane estimation process in step S5.

In step S5a, lanes Lt−1', Lt−2' at the previous time points t−1, t−2 after coordinate conversion into which the lanes Lt−1, Lt−2 at the previous time points t−1, t−2 are coordinate-converted based on the traveling information Rc(v,yr) at the current time point t are calculated.

Figure 5:
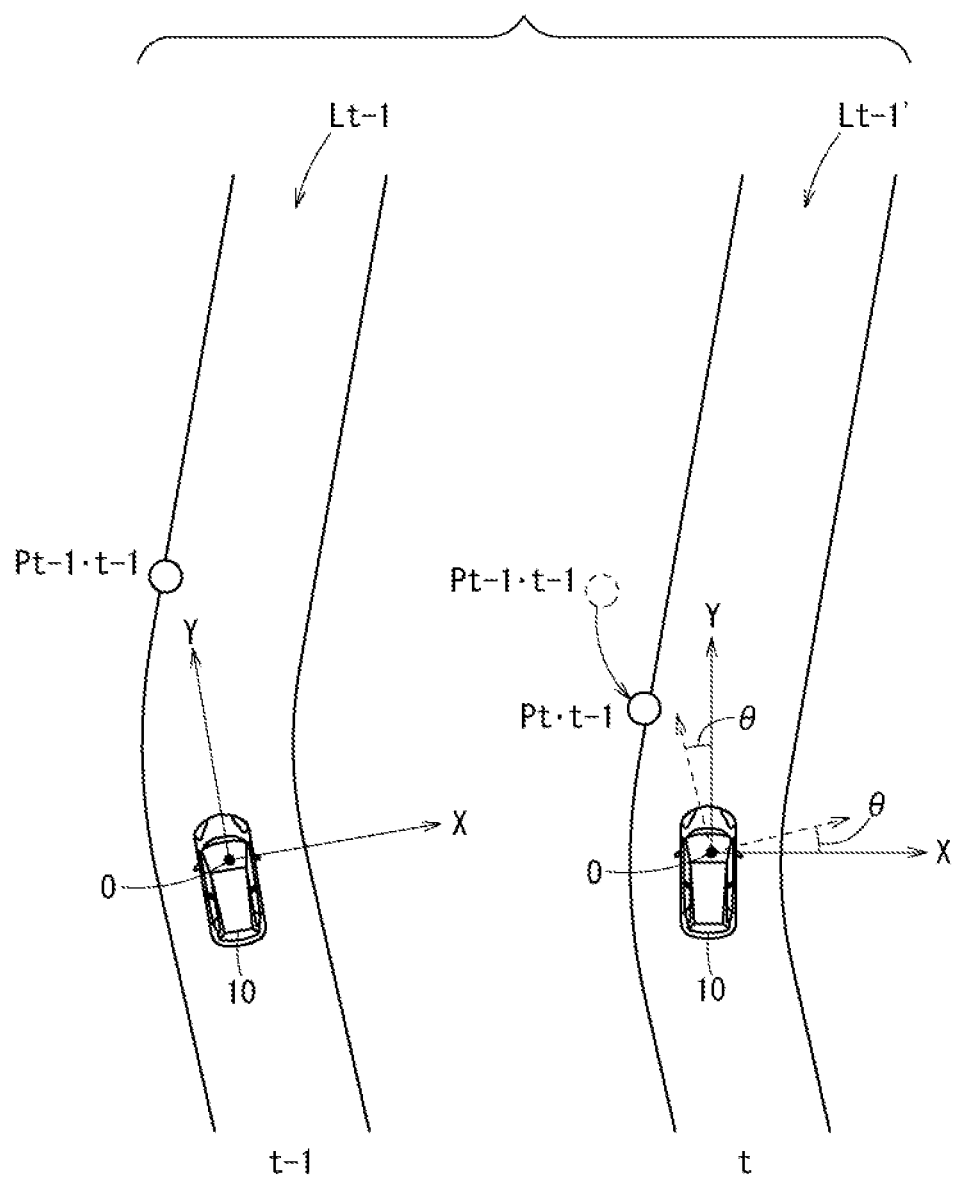
FIG. 5 is an illustration of a process to convert coordinates of a previous-time lane onto a current-time lane based on traveling information at a current time point.

FIG. 5 is a schematic illustration for illustrating the coordinate conversion with the lanes Lt−1, Lt−1' as an example.

Suppose that a point on the lane Lt−1 (left lane viewed from the front in FIG. 5) detected at the previous time point t−1 is point Pt−1·t−1, The XY coordinates of the point Pt−1·t−1 viewed from the origin position O of the vehicle coordinates were already calculated at the previous time point t−1 (step S2) when the lane Lt−1 was calculated, and are considered to be point Pt−1·t−1 (Xpt−1·t−1,Ypt−1·t−1).

On the one hand, suppose that point Pt·t−1 (Xpt·t−1, Ypt·t−1) is a coordinate-converted point of point Pt−1·t−1 (Xpt−1·t−1,Ypt−1·t−1) on the lane Lt−1' (the right lane viewed from the front in FIG. 5) at the previous time point t−1 after coordinate conversion that is coordinate-converted based on the traveling information Rc(v, yr) at the current time point t.

The XY coordinates of the point Pt·t−1 at the current time point t on the lane Lt−1' detected at the previous time point t−1 can be calculated as a composite value of rotation (turning angle θ is θ=yr×ΔT) of the coordinate axis of the vehicle 10 and travel (travel amount in the X axis and Y axis directions for the time ΔT at the vehicle speed v) of the vehicle 10 for the specified time ΔT [ΔT=t−(t−1)] from the previous time point t−1 to the current time point t.

The lane Lt−1' at the previous time point, t−1 after coordinate conversion that is coordinate-converted based on the traveling information Rc(v,yr) at the current time point t in consideration of the rotation of the coordinate axis and the travel of the vehicle 10 is illustrated as the right lane viewed from the front in FIG. 5.

Note that the X coordinate and the Y coordinate (XY coordinates) at the current time point t of points Pt·t−2 on the lane Lt−2' detected at the previous time point t−2 can be coordinate-converted by making the specified time ΔT ΔT=2ΔT. Virtually, since information at the previous time point t−2 was already coordinate-converted at the previous time point t−1, the coordinates could be calculated with the specified time ΔT if the information at the previous time point t−2 coordinate-converted at the previous time point t−1 was used.

Figure 6:
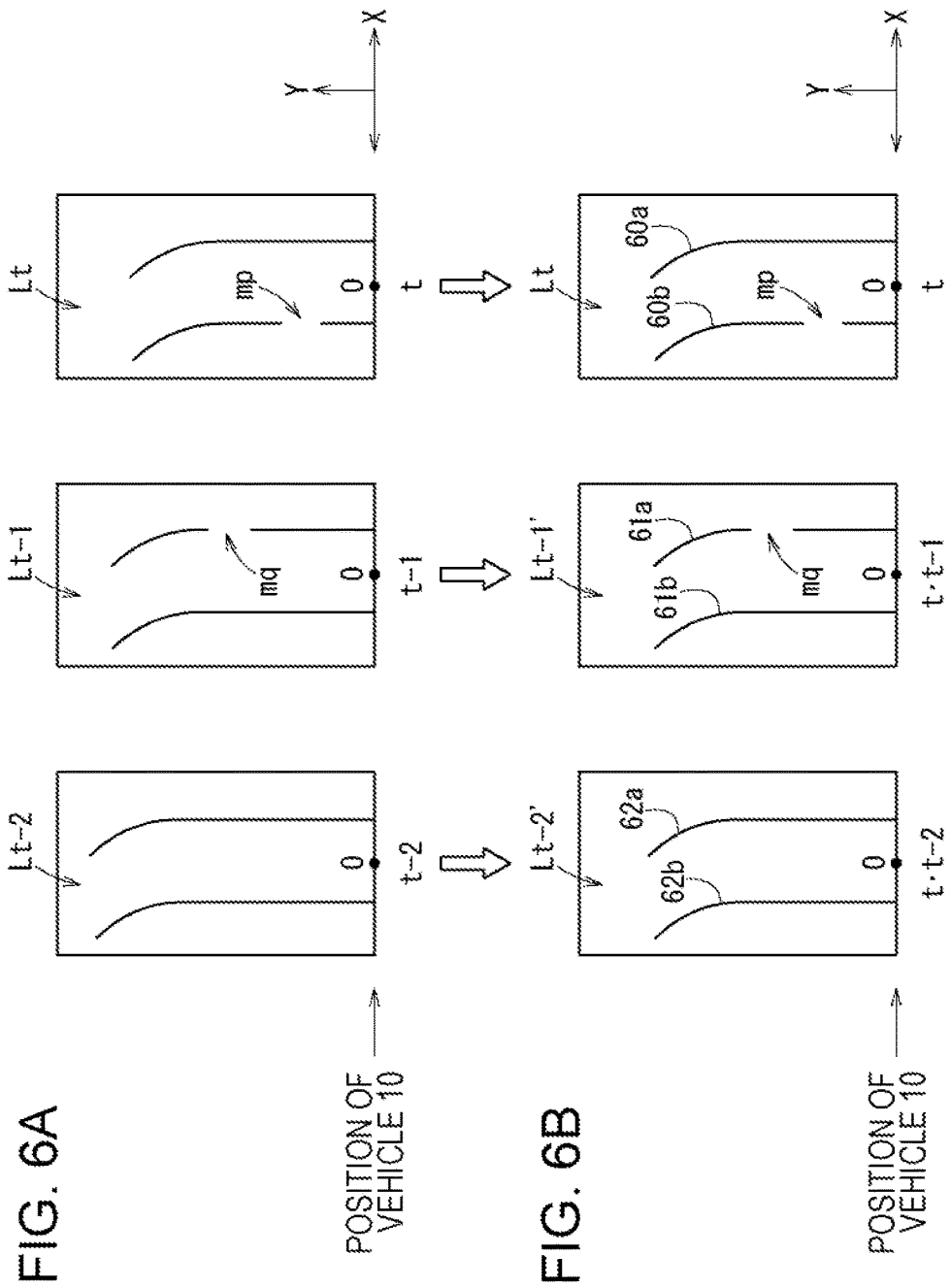
FIG. 6A is an illustration of a lane before coordinate conversion.
FIG. 6B is an illustration of the lane after the coordinate conversion.

FIG. 6A illustrates again the lanes Lt, Lt−1, Lt−2 before coordinate conversion which consist of point-series of feature points illustrated in FIG. 3. FIG. 6B schematically illustrates the lane Lt−2' at the time t·t−2 after coordinate conversion of the lane Lt−2 detected at the previous time point t−2 to the current time point t, the lane Lt−1' at the time t·t−1 after coordinate conversion of the lane Lt−2 detected at the previous time point t−2 to the current time point t, and the lane Lt detected at the current time point t, each of which consists of point-series of feature points. Note that the lanes Lt, Lt−1', and Lt−2' consist of the point-series 60a, 61a, 62a of feature points on the right lanes and the point-series 60b, 61b, 62b of feature points on the left lanes, respectively.

Then, in step S5b, the lane estimation unit 34 uses these lanes Lt, Lt−1', Lt−2' (FIG. 6B) to calculate a more reliable lane Lt* at the current time point t through a superimposition robust estimation process, following procedures (I-i) to (I-vii) to be described below.

Figure 7:
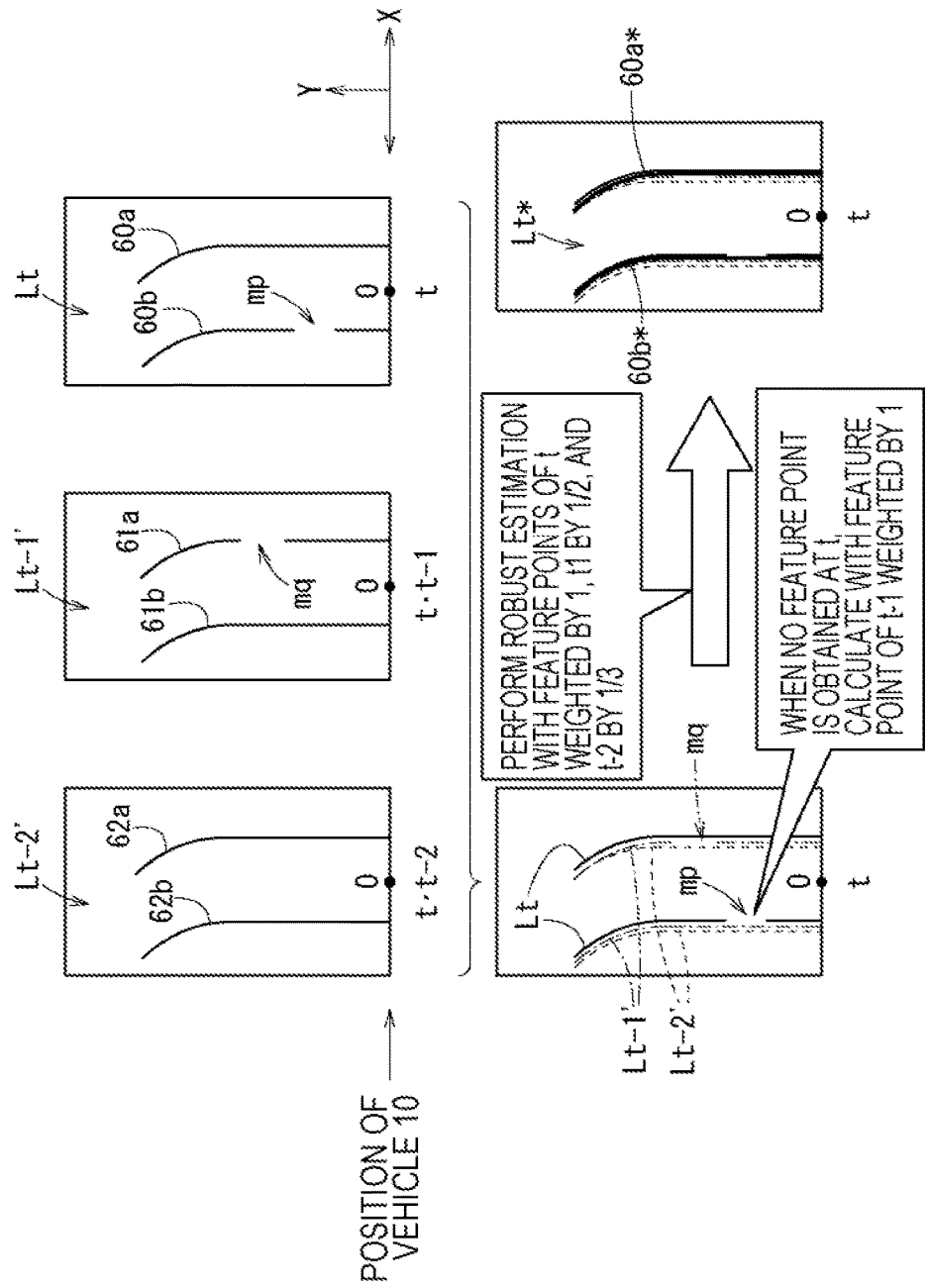
FIG. 7 is an illustration of a superimposition robust estimation process.

(I-i) In this case, first, as illustrated in the left bottom figure of the schematic diagram of FIG. 7, superimpose the lane Lt (depicted in solid lines) at time t as illustrated in the upper figure of FIG. 7, the lane Lt−1' (depicted in dashed-dotted lines) at the time t·t−1 after coordinate conversion, and the lane Lt−2' (depicted in dashed lines) at time t·t−2 after coordinate conversion with the origin positions of those lanes matched.

(I-ii) Next, calculate each approximate curve (6 curves in this case) such as a quadric curve or a clothoid curve based on the least-square method on the point-series of feature points, 60a, 60b, 61a, 61b, 62a, 62b. Note that the approximate curve also includes an approximate straight line.

Figure 8:
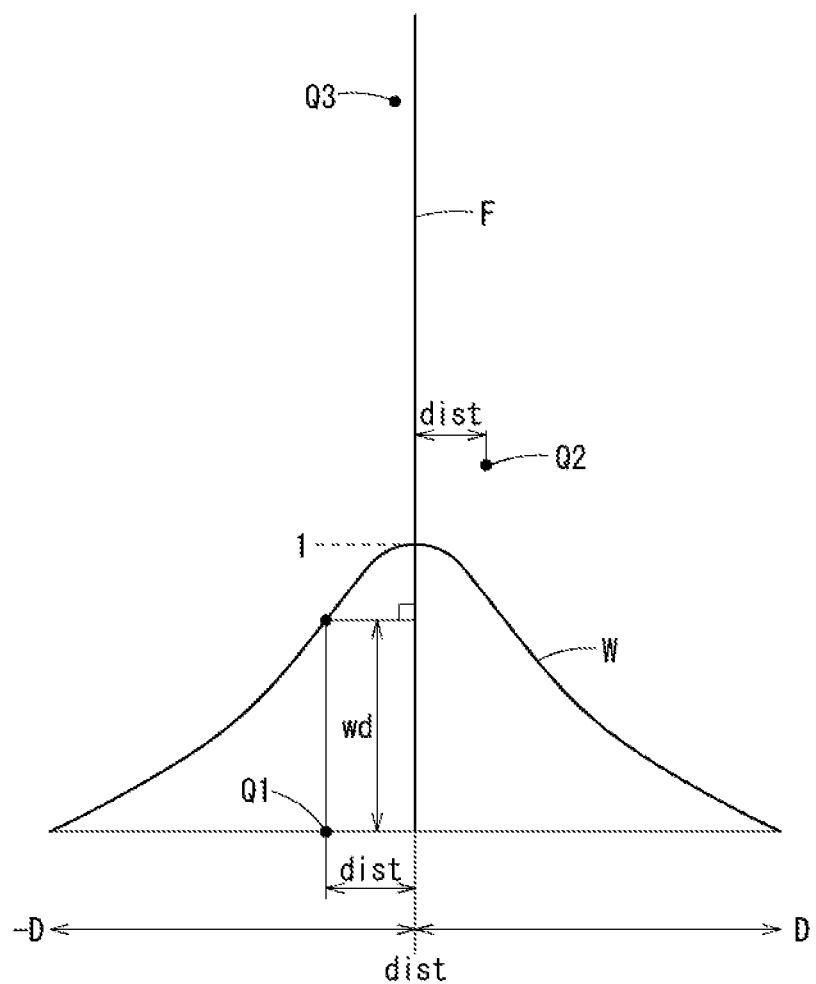
FIG. 8 is an illustration of a weighting function in the superimposition robust estimation process.

FIG. 8 schematically depicts one approximate curve F and point-series Q(Q1,Q2,Q3) of feature points, which are described as an example, of the approximation quadric curves calculated with the least-square method. In this FIG. 8, a Gaussian distribution function is depicted as a weighting function W that performs weighting of each feature point Q1, Q2, Q3 of the point-series Q(Q1,Q2,Q3) of the feature points. For the Gaussian distribution function, an allowable error D is set and a maximum value is a value of 1.

(I-iii) Then, a difference dist between the coordinates of each of points Q1, Q2, Q3 and the approximate curve F is determined.

(I-iv) Then, a weighting factor wd of the difference dist of the respective points Q1, Q2, Q3 is calculated with the following expressions (1) and (2):

When dist<−D or when dist>D, $wd=0$     (1)

When −D≤dist≤D, $wd=[1-(dist/D)^2]^2$     (2)

(I-v) Here, the allowable error D of the lane Lt at the current time point t should be smaller, and that of the lanes Lt−1', Lt−2' at the previous time points t·t−1, t·t−2 should be larger since an error due to coordinate conversion and noise is added. In addition, due to the properties of the camera 16 or the like, an error in the vicinity of the own vehicle 10 is small and increases as it is farther from the own vehicle 10.

Thus, multiply the allowable error D by a factor sp (not illustrated) for expanding a range of the allowable error D as for the information on the lanes Lt−1', Lt−2' at the previous time points t·t−1, t·t−2, and by a factor de (not illustrated) for expanding the range of the allowable error D as for the depth direction (forward direction of the vehicle 10).

(I-vi) Although a maximum value of the weighting factor wd is a value 1, multiply the weighting factors wd for the lanes Lt−1', Lt−2' at the previous time points t·t−1, t·t−2 by a correction factor r (0<r≤1) (not illustrated), because it is believed that information closer to the current time point t is more reliable. In principle, the correction factor r takes a smaller value as information is older. For example, compared to the weighting factor wd=r·wdy→1·wd by which the lane Lt at the current time point t is multiplied, the weighting factor for the lane Lt−1' at the previous time point t·t−1 is set as wd=r·wd→wd/2 (half), and the weighting factor for the lane Lt−2' at the previous time point t·t−2 is set as wd=r·wd→wd/3 (one-thirds). However, since there is no point-series in the missing part mp of the point-series 60b at the current time point t, the weighting factor wd of the point-series corresponding to the missing part mp in the lane Lt−1' at the previous time point t·t−1 is set as wd=r·wd→1·wd, and the weighting factor wd of the point-series corresponding to the missing part mp in the lane Lt−2' at the previous time point t·t−2 is set as wd=r·wd→wd/2. Similarly, since there is no point-series in the missing part mq of the point-series 61a at the previous time point t·t−1, the weighting factor wd of the point-series corresponding to the missing part mq in the lane Lt−2' at the previous time point t·t−2 is set as wd=r·wd→wd/2.

(I-vii) By performing curve approximation of the quadric curve based on the least-square method again after performing the weighting on the difference dist of each point Q1, Q2, Q3, a more liable lane Lt* consisting of a more reliable right lane line 60a* (not a point-series but an approximate line) and a more reliable left lane line 60b* (not a point-series but an approximation line) at the current time point t can be estimated, as depicted by the thick solid line in the right bottom figure of FIG. 7.

Thus, for even a road (course) having much noise such as missing parts mp, mq or the like, estimation (recognition, calculation) of the lane Lt* necessary for detection of a curve starting point or the like is enabled.

Thus, in step S5, a more reliable lane Lt* at the current time point t can be estimated (recognized, calculated).

In addition, the superimposition robust estimation process described with reference to FIG. 8 is performed for every image of three consecutive frames. However, it can be performed for every appropriate number of frames such as 2 or more, considering a processing speed of the ECU 20, the vehicle speed v, and the reference frame time ΔT.

[Curve Starting Point Estimation]

When a curve starting point is estimated, first, detect a curve starting point candidate point.

Then, in step S6, a detection process of curve starting point candidate points (also referred to as a curve starting position candidate position, a curve starting point candidate position, a curve entry candidate point, or a curve entry candidate position) Ct−2, Ct−1, Ct at the previous time points t−2, t−1 and the current time point t is performed by the curve starting point detection unit 36 with the following procedures (II-i) to (II-iii) to be described below.

Figure 9:
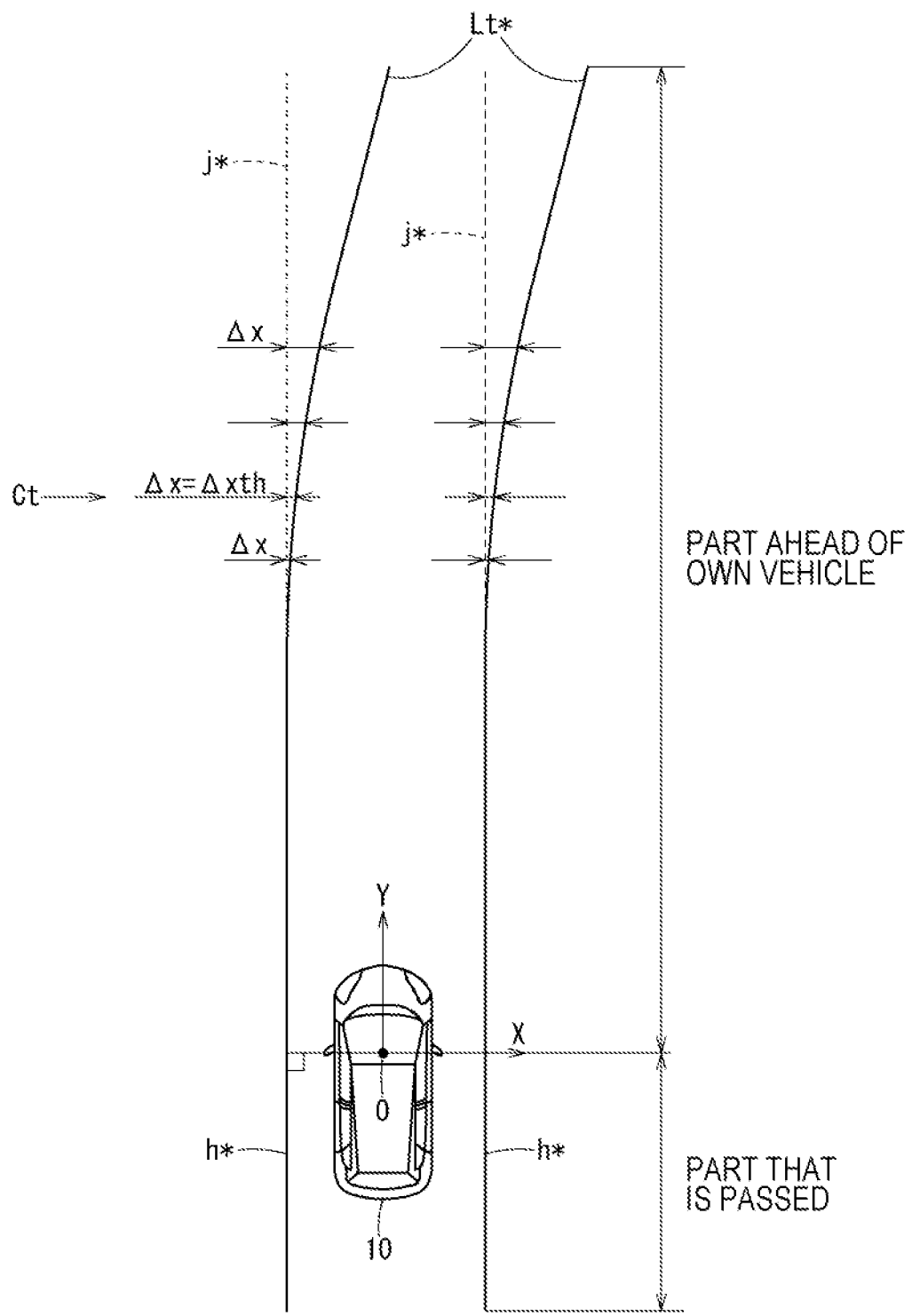
FIG. 9 is a conceptual illustration of a detection technique of a curve starting point candidate point.

(II-i) FIG. 9 is a conceptual illustration of a detection technique of a curve starting point candidate point Ct.

First, obtain an approximate straight lane h* through linear approximation of the part of lane [image (point-series of feature points) having characteristics as a projection-converted lane mark] which the vehicle (own vehicle) 10 has passed through, and which is extracted with respective to a position of the vehicle 10 from the lane Lt* [of an approximate curve (approximation quadric curve)] at the current time point t estimated by the lane estimation unit 34. This approximate straight lane h* shall be the approximate straight lane h* estimated through the lane estimation process (weighting superimposition robust estimation process) described in step S5.

(II-ii) Calculate a distance Δx in the X axis direction (vehicle width direction) from an approximate straight lane j* that is made by extending the approximate straight lane h* forward in the Y axis direction of the origin position O of the vehicle 10, to the points ahead of the own vehicle 10 on the estimated lane Lt* [of an approximate curve (approximate quadric curve)] at the current time point.

(II-iii) Determine a point at which the calculated distance Δx is equal to or higher than a threshold Δxth predefined through experimentation or simulation or the like as a curve starting point candidate point Ct at the current time point t (step S6).

Virtually, since the processes from step S1 to step S6 are performed continuously, as illustrated in FIG. 10A, more reliable lanes Lt−2*, Lt−1*, Lt* are estimated through the superimposition robust estimation process at the time t−2, t−1, and t, respectively. Also, as illustrated in FIG. 10B, the curve starting point candidate points Ct−2, Ct−1, Ct are detected at the time points t−2, t−1, t, respectively, through the curve starting point candidate point detection process.

Note that as time elapses, positions of the respective curve starting point candidate points Ct−2, Ct−1, Ct come nearer. More specifically, they come closer to the vehicle 10 (origin position O of the vehicle 10) at the previous time point t−1 than the previous time point t−2, and they comes even closer at the current time point t than the previous time point t−1.

Then, in step S7, based on the curve starting point candidate points Ct−2, Ct−1, Ct, a more reliable curve starting point Ct* at the current time point (see FIG. 12 to be described below) is estimated with the procedures (III-i) to (III-iv) to be described below.

(III-i) Define a Gaussian distribution function as a weighting function Wt in which a maximum value "1" is taken at a position (detection position) of the curve starting point candidate point Ct detected at the current time point t in the direction (forward direction, see FIG. 9) of the approximate straight lane j* extended forward from the vehicle 10, and in which a value of the function decreases as it is away from a position of the maximum value "1" in the front and back directions.

(III-ii) The right figure of FIG. 11 illustrates superimposed positions of the curve starting point candidate points Ct−2′, Ct−1′, resulting from coordinate conversion at the current vehicle speed v of the curve starting point candidate points Ct−2, Ct−1 detected at the previous time points t−2, t−1 in the direction (forward direction, see FIG. 9) of the approximate straight lane j* extended forward from the vehicle 10, and of the curve starting point candidate point Ct at the current time point t. Note that the coordinate conversion in this case is possible with the following expressions (3) and (4), because θ=0 (rad) when reference is made to the expression (2) described above.

$$Ypt·t-1 = -V \times \Delta T \qquad (3)$$

$$Ypt·t-2 = -V \times 2\Delta T \qquad (4)$$

Also in this case, since information at the previous time point, t−2 was already coordinate-converted at the previous time point t−1, the expression (4) can be replaced with the following expression (5) if that information is used.

$$Ypt·t-2 = (Ypt·t-1) - V \times \Delta T \qquad (5)$$

Figure 12:
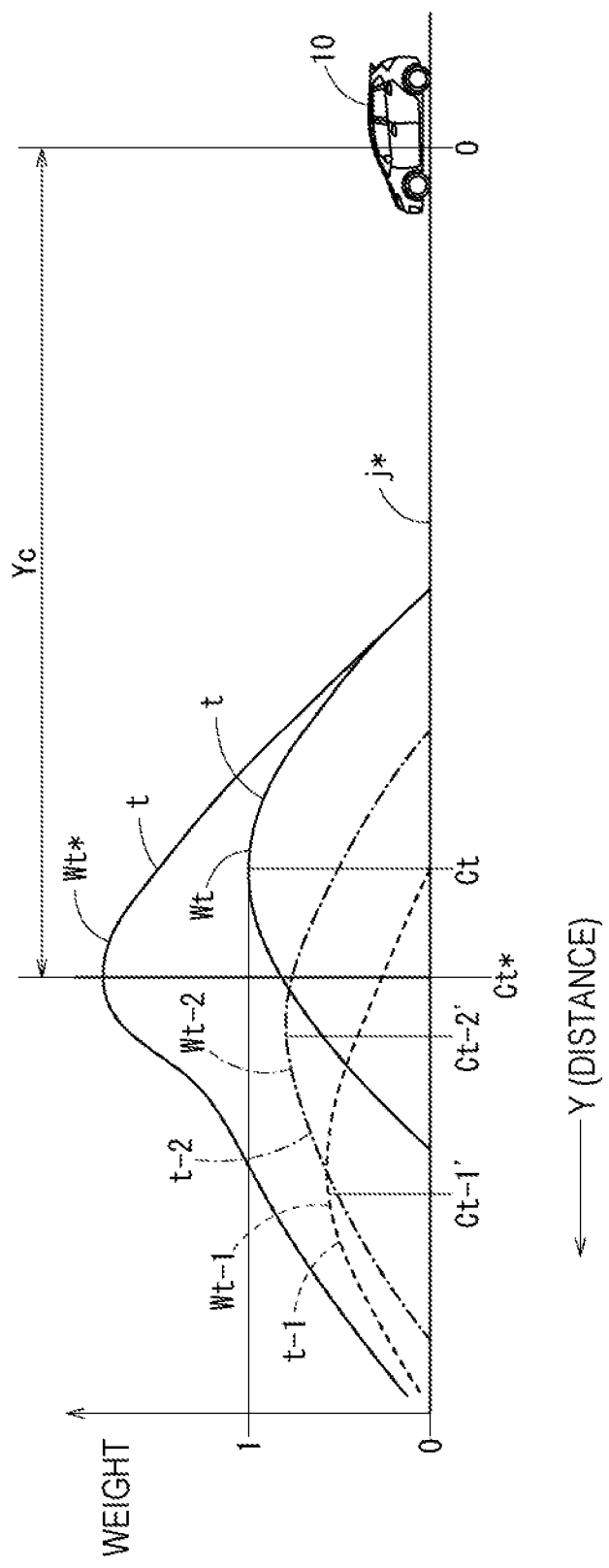
FIG. 12 is an illustration of when a maximum value of a weighting function is set to each curve starting point candidate point at a current time point and a previous time point and a more reliable curve starting point from a current-time vehicle position is recognized from a composite weighting function.

(III-iii) In (III-i) described above is defined the weighting function Wt that takes the maximum value "1" at the position (detection position) of the curve starting point candidate point Ct detected at the current time point t on the direction (forward direction, see FIG. 9) of the approximate straight lane j* extended forward from the vehicle 10. Then, next, Gaussian distribution functions are also defined for curve starting point candidate points Ct−1′, Ct−2′ at the previous time points t−1, t−2. However, then, weighting functions Wt−1, Wt−2 are defined such that a maximum value becomes smaller as it is farther from the position of the curve starting point candidate point Ct at the current time point t in the front-back direction of the Y direction. In the example of FIG. 12, the curve starting point candidate point Ct−1′ at the previous time point t−1 is at a position which is farther from the curve starting point candidate point Ct at the current time point t in the Y axis direction than the curve starting point candidate point Ct−2′ at the previous time point t−2. Thus, a maximum value of the weighting function Wt−2 is made larger than the maximum value of the weighting function Wt−1. Therefore, in the example of FIG. 12, a relation of the maximum values is such that 1=the maximum value of the weighting function Wt> the maximum value of the weighting function Wt−2> the maximum value of the weighting function Wt−1.

FIG. 12 thus illustrates a state in which amplitude characteristics of the weighting functions Wt, Wt−1, Wt−2 whose respective maximum values are positioned at the curve starting point candidate points Ct, Ct−1′, Ct−2′ are associated with the vehicle 10 at the origin position O and arranged on the approximate straight lane j* extended forward from the vehicle 10.

(III-iv) Then, a composite weighting function (composite distribution function) Wt* is calculated by adding all the weighting functions Wt, Wt−1, Wt−2, and a point (maximum value) at which this composite weighting function Wt* peaks is estimated (recognized, calculated) to be a more reliable curve starting point Ct* at the current time point t that exists at a distance Yc from the origin position (position of the vehicle 10 at the current time point t) O on the approximate straight lane j* (step S7).

[Driving Assistance]

In step S7, when the curve starting point Ct* is estimated and determined, the curve starting point estimation unit 38 provides the driving assistance unit 40 with a distance Yc [m] from the origin position O (position of the vehicle 10)

at the current time point t to the curve starting point Ct* as well as data on the approximate quadric curve.

Now, the data on the approximation quadric curve is intended to calculate a curvature (or curvature radius) of a curve starting from the curve starting point Ct*. Thus, when the curvature of the curve (or the curvature radius) is known from map data, not illustrated, the map data may be utilized.

The driving assistance unit 40 that is included in the steering assistance device 13 determines starting timing when the steering device 50 starts to turn at the curvature (or the curvature radius) of the curve at the curve starting point Ct*. In the case of automatic steering, the driving assistance unit 40 drives and controls the steering device 50 as such. Note that if the vehicle 10 is cruising at a constant vehicle speed v, and when a curve is a gentle curve, accurate starting timing can be simply determined by dividing the distance Yc by the vehicle speed v.

In step S8, the driving assistance unit 40 provides the driver with driving assistance by controlling the steering device 50, the braking device 52, the acceleration device 54 and the like so that the vehicle 10 does not deviate from the lane between the lane marks formed on the road surface, namely, the estimated lane Lt*, in other words, so that the vehicle 10 can travel at the center of the lane Lt* including the estimated (lane of the) curve. If it is determined that the vehicle 10 has not sufficiently decelerated before the curve starting point Ct*, the driving assistance unit 40 actuates the braking device 52 to provide assistance. Alternatively, in order to prompt actuation of the braking device 52, the driving assistance unit 40 applies reaction force to an accelerator pedal (not illustrated).

SUMMARY OF EMBODIMENTS

As described above, the lane detection device 11 according to the embodiment described above, includes the camera 16 as an imaging device, the lane detection unit 30, the lane memory 44 (storage unit), the speed sensor 22 and the yaw rate sensor 24 as a traveling information detection unit, and the lane estimation unit 34.

The camera 16 captures an image of the forward view of the vehicle 10 including a road surface. The lane detection unit 30 detects a lane mark formed on the road surface from the image captured by the camera 16 and stored in the image memory 42 (storage unit), and detects a lane from the detected lane mark. The lane memory 44 stores a lane Lt at current time point t detected by the lane detection unit 30 and lanes Lt−1, Lt−2 (FIG. 3, FIG. 6A: point-series of feature points) at previous time points t−1, t−2 detected by the lane detection unit 30 predetermined time ΔT, 2ΔT before the current time point t. The speed sensor 22 and the yaw rate sensor 24 detects a vehicle speed v and a yaw rate yr (traveling information) of the vehicle 10, respectively, when the lane Lt and the lanes Lt−1, Lt−2 are detected. The lane estimation unit 34 estimates a more reliable lane Lt* (see the right bottom figure of FIG. 7) at the current time point t through the quadric curve approximation method, on the basis of lanes Lt−1' Lt−2' at previous time points after coordinate conversion, into which the lanes Lt−1, Lt−2 at the previous time points t−1, t−2 are coordinate-converted based on the traveling information (the vehicle speed v and the yaw rate yr) at the current time point t and of the lane Lt at the current time point t (see FIG. 6B, Lt, Lt−1', Lt−2').

According to the embodiment, the more reliable lane Lt* at the current time point t is estimated by using the lanes Lt−1', Lt−2' (FIG. 6B) at the previous time points t−1, t−2 after coordinate conversion that is coordinate-converted based on the traveling information (the vehicle speed v and the yaw rate yr) at the current time point t, as well as the lane Lt at the current time point t. Thus, even when a part of a lane mark (lane) is faded or when the lane mark (lane) is missing [in addition to when a part of a lane mark (lane) is hidden by presence of a preceding vehicle or the like, when a lane mark (lane) cannot be temporarily detected due to backlight, or headlights of an oncoming car during the night], the more reliable current-time lane Lt* can be accurately estimated from the lanes Lt, Lt−1, Lt−2 composed of the time series of the current time point t and the previous time points t−1, t−2.

In addition, since the lane estimation unit 34 performs lane estimation through the quadric curve approximation that superimposes the lane Lt at the current time point t and the lanes Lt−1', Lt−2' of the previous time points t−1, t−2 after coordinate conversion, the more reliable lane Lt* at the current time point t can be estimated even if the lane includes a curve.

Now, when superimposing the lane Lt at the current time point t and the lanes Lt−1', Lt−2' at the previous time points t−1, t−2 after coordinate conversion to thereby estimate a more reliable lane at the current time point t, the lane estimation unit 34 makes a weighting factor wd (see FIG. 8) of the lanes Lt−1', Lt−2' at the previous time points t−1, t−2 after coordinate conversion smaller than a weighting factor wd of the lane Lt at the current time point t. The lane estimation unit 34 can estimate an accurate lane in a stable manner by, for example, setting the weighting factor wd of the lane Lt−1' at the previous time point t−1 to wd/2 and the weighting factor wd of the lane Lt−2' at the previous time point t−2 to wd/3, thus making each of them smaller than the weighting factor wd of the lane Lt at the current time point t, superimposing them, and performing robust estimation.

However, if the lane Lt at the current time point t has a missing part when the lane estimation unit 34 estimates the more reliable lane Lt* at the current time point t by superimposing the lane Lt at the current time point t and the lanes Lt−1', Lt−2' at the previous time points t−1, t−2 after coordinate conversion, rather than making smaller the weighting factor wd of the lanes Lt−1', Lt−2' (for example, point-series 61b, 62b of feature points of the left lane as illustrated in FIG. 6B) located at positions corresponding to the lane Lt having a missing part (for example, a missing part mp in the point-series 60b of feature points of the left lane in the lane Lt, as illustrated in FIG. 6B) at the current time point t of the lanes Lt−1', Lt−2' of the previous time points t−1, t−2 after coordinate conversion, the lane estimation unit 34 uses the weighting factor wd of the lane Lt at the current time point t [with a weighting factor of a part in the point-series 61b of the feature points of the previous time point t−1 which corresponds to the missing part mp as wd, and a weighting factor of a part in the point-series 62b of the feature points at the previous time point t−2 which corresponds to the missing part mp part as wd (or wd/2)] to perform superimposition.

Thus, if the lane Lt at the current time point t has the missing part mp, rather than making smaller the weighting factor wd of the lanes Lt−1', Lt−2' which are located at the positions corresponding to the lane Lt at the current time point t having the missing part mp and which are of the lanes Lt−1', Lt−2' at the previous time points t−1, t−2 after coordinate conversion, the lane estimation unit 34 uses the weighting factor wd of the lane Lt at the current time point t to perform superimposition. More specifically, since the weights of the lanes Lt−1', Lt−2' at the previous time points t−1, t−2 after coordinate conversion, the lanes being detected at the part of the lane Lt at the current time point t having the missing part mp, are increased, the part having the missing part mp of the lane Lt at the current time point t can be robust estimated more reliably through superimposition.

The curve starting point detection device 12 according to the embodiment includes the lane detection device 11 described above. The more reliable lane Lt* (FIG. 9) at the current time point t estimated by the lane estimation unit 34 of the lane detection device 11 is the lane Lt* of the approximation quadric curve extending forward from the own vehicle position O. The straight-lane-behind-own-vehicle estimation unit 37 of the curve starting point detection unit 36 included in the curve starting point detection device 12 further estimates a more reliable lane at the current time point t extending backward from the own vehicle position O through linear approximation on the basis of lanes at the previous time points t−1, t−2 extending backward from the own vehicle position O after coordinate conversion, into which the lanes at the previous time points t−1, t−2 extending backward from the own vehicle position O are coordinate-converted based on traveling information (in this case vehicle speed v only) at the current time point t, and of the lane at the current time point t extending backward from the own vehicle position O, and obtains an approximate straight lane h* (FIG. 9) (straight-lane-behind-own-vehicle estimation step).

Then, the curve starting point estimation unit 38 superimposes the more reliable approximate straight lane h* at the current time point t extending backward from the own vehicle position O on the lane Lt* of the approximation quadric curve extending forward from the own vehicle position O. The curve starting point estimation unit 38 detects, as a curve starting point candidate point Ct, a point at which a distance $\Delta x$ (FIG. 9) in the vehicle width direction between a straight line j* which is the approximate straight lane h* extended forward from the own vehicle position O and the lane Lt* of the approximation quadric curve reaches or exceeds a threshold distance $\Delta xth$, and detects curve starting point candidates points Ct−1′, Ct−2′ (FIG. 11) in the lanes at the previous time points t−1, t−2 after coordinate conversion. Then, the curve starting point estimation unit 38 matches a maximum value "1" of a weighting function Wt of a Gaussian distribution function that is defined along the direction of the approximate straight line j* extended forward from the own vehicle position O to the curve starting point candidate point Ct detected at the current time point t, matches maximum values (in this embodiment, the maximum value of the weighting function Wt−1< the maximum value of the weighting function Wt−2< the maximum value of the weighting function Wt=1) of weighting functions Wt−1, Wt−2 (both are a Gaussian distribution function) that are defined along the direction of the straight line j* to the curve starting point candidate points Ct−1′, Ct−2′ in the lanes of the previous time points t−1, t−2 after coordinate conversion, and estimates, as a more reliable curve starting point Ct* (FIG. 12) from the origin position (position of the vehicle 10) O at the current time point t, a position (position at a distance Yc from the origin position O) of a maximum value of a composite distribution function Wt* combined by adding the weighting functions Wt, Wt−1, Wt−2 (Gaussian distribution functions) (curve starting point estimation step).

Thus, since the more reliable curve starting point Ct at the current time point t is estimated by using the curve starting points Ct−1′, Ct−2′ at the previous time points t−1, t−2 after coordinate conversion as well as the curve starting point Ct at the current time point t, the more reliable curve starting point Ct* can be estimated in a stable manner.

Additionally, since the curve starting point Ct* is estimated by making weight of the curve starting point Ct detected at the current time point t which is located closer to the own vehicle 10 larger than weight of the curve starting points Ct−1′, Ct−2′ detected at the previous time points t−1, t−2 which are located farther than the curve starting point Ct detected at the current time point t, the more reliable curve starting point Ct* can be estimated in more stable manner.

The steering assistance device 13 according to the embodiment has the steering device 50 (FIG. 1) including an EPS (electrically-driven power steering) device as an actuator for generating steering assistance force of the vehicle 10, in addition to the curve starting point detection device 12. The steering assistance device 13 is configured to use the more reliable estimated curve starting point Ct* described above and determine timing when the steering device 50 starts to apply the steering assistance force of the vehicle 10, thereby being able to provide steering assistance at the position of the more reliable curve starting point Ct* and at accurate timing.

Note that the present disclosure is not limited to the embodiments described above and may take various configurations based on what has been described in the description.

What is claimed is:

1. A lane detection method, comprising:
   an image capturing step of capturing an image of a road surface in a forward view of a vehicle traveling on a lane to provide a road surface image;
   a lane detection step of detecting a lane mark in the road surface image and defining an imaginary lane based on the detected lane mark to provide lane information of the imaginary lane;
   a lane storage step of storing current-time lane information detected and defined in the lane detection step and a previous-time lane information detected and defined in the lane detection step a predetermined time before the current time point;
   a traveling information detection step of detecting traveling information of the vehicle when the lane is detected; and
   a lane estimation step of coordinate-converting the previous-time lane information based on the traveling information at the current time point and generating reliable current-time lane information through curve approximation on the basis of the coordinate-converted previous-time lane information and the current-time lane information,
   wherein the reliable current-time lane information generated in the lane estimation step indicates an approximate curve lane extending forward from an subject vehicle position, the method further comprises a curve starting point detection method which comprises:
   a straight-lane estimation step of coordinate-converting a previous-time straight lane information of an imaginary lane extending backward from the subject vehicle position based on the traveling information at the current time point and generating reliable current-time straight lane information of an imaginary line extending backward from the subject vehicle position through linear approximation on the basis of the coordinate-converted previous-time straight lane information and the current-time straight lane information; and
   a curve starting point estimation step comprising the steps of superimposing the estimated reliable current-time approximate straight lane on the approximate curve lane extending forward from the subject vehicle position estimated in the lane estimation step;

detecting, as a current-time curve starting point candidate point in the current-time lane, a point at which a distance in a vehicle width direction between the straight line extended forward from the subject vehicle position along the approximate straight lane and the approximate curve lane reaches or exceeds a threshold distance and detecting a curve starting point candidate point in the coordinate-converted previous-time lane;

matching a maximum value of a first Gaussian distribution function that is defined along a direction of the straight line extended forward from the subject vehicle position to the curve starting point candidate point detected at the current time point;

matching a maximum value of a second Gaussian distribution function that is defined along the direction of the straight line extended forward from the subject vehicle position to a curve starting point candidate point in the coordinate-converted previous-time lane, the maximum value of the second Gaussian distribution function being made smaller than the maximum value of the first Gaussian distribution function; and estimating, as a more reliable curve starting point, a position of a maximum value of a composite distribution function obtained by adding the first Gaussian distribution function having the maximum value and the second Gaussian distribution function having the smaller maximum value.

2. The lane detection method according to claim 1, wherein the traveling information at the current time point includes a vehicle speed as well as any one of a yaw rate and a steering angle at the current time point, and in the lane estimation step, the reliable current-time lane is generated by superimposing the current-time lane information and the coordinate-converted previous-time lane information.

3. The lane detection method according to claim 2, wherein in the lane estimation step, when the reliable current-time lane information is generated by superimposing the current-time lane information and the coordinate-converted previous-time lane information, in which a weighting factor of the coordinate-converted previous-time lane is made smaller than a weighting factor of the current-time lane.

4. The lane detection method according to claim 3, wherein in the lane estimation step, when the reliable current-time lane information is generated by superimposing the current-time lane information and the coordinate-converted previous-time lane information, if the current-time lane information has a missing lane part, the weighting factor of the current-time lane information is used for a weighting factor of the coordinate-converted previous-time lane information, without making the weighting factor of the coordinate-converted previous-time lane information smaller than the weighting factor of the current-time lane information with respect to a position corresponding to the missing lane part in the current-time lane information.

* * * * *